United States Patent [19]
Sticht

[11] Patent Number: 5,205,026
[45] Date of Patent: Apr. 27, 1993

[54] PRODUCTION INSTALLATION

[76] Inventor: Walter Sticht, Karl-Heinrich-Waggerl-Str. 8, A-4800 Attnang-Puchheim, Austria

[21] Appl. No.: 504,976

[22] Filed: Apr. 4, 1990

[30] Foreign Application Priority Data

Apr. 4, 1989 [AT] Austria ................. A791/89

[51] Int. Cl.$^5$ ............................. B65G 47/74
[52] U.S. Cl. .................. 29/33 P; 198/346.1; 198/465.2
[58] Field of Search .............. 29/33 P; 198/346.1, 198/469.2

[56] References Cited

U.S. PATENT DOCUMENTS

| 4,492,297 | 1/1985 | Sticht . | |
|---|---|---|---|
| 4,530,287 | 7/1985 | Sitcht . | |
| 4,619,205 | 10/1986 | Sticht . | |
| 4,681,043 | 7/1987 | Sticht . | |
| 4,762,218 | 8/1988 | Sitcht . | |
| 4,783,904 | 11/1988 | Kimura | 198/465.2 |
| 4,884,330 | 12/1989 | Sticht | 29/430 |
| 5,103,963 | 4/1992 | Sticht | 29/33 P |

FOREIGN PATENT DOCUMENTS

| 56063 | 7/1982 | European Pat. Off. ......... 198/346.1 |
| 238838 | 9/1987 | European Pat. Off. . |
| 2536433 | 2/1977 | Fed. Rep. of Germany ... 198/346.1 |
| 2754095 | 7/1978 | Fed. Rep. of Germany ... 198/346.1 |
| 3222657 | 12/1982 | Fed. Rep. of Germany . |
| 3540316 | 5/1987 | Fed. Rep. of Germany ... 198/346.1 |
| 149088 | 11/1979 | Japan ............................. 29/33 P |
| 61-142033 | 6/1986 | Japan . |
| 142047 | 6/1986 | Japan ............................. 198/346.1 |
| 656338 | 6/1986 | Switzerland . |

Primary Examiner—Daniel W. Howell
Attorney, Agent, or Firm—Collard & Roe

[57] ABSTRACT

The invention relates to a production installation (1) for assembling and/or processing components (3) made up of a plurality of piece parts (4). In this installation, the piece parts (4) and/or the components (3) are disposed and/or assembled and/or processed on pallet trays (6). The pallet trays (6) are interchangeably disposed on the running mechanisms (2). The running mechanisms (2) are guided along the conveyor track of a conveying device. The conveyor track has parallel conveying paths (19) which are disposed in sections parallel to a main conveying at (18) and are connected by transverse conveying paths (21) to the main conveying path (18). A subsidiary conveying path (20) is associated with the parallel conveying path (19), directly adjacent and extending parallel to it. This subsidiary conveying path is preferably connected by transfer stations to the transverse conveying or parallel conveying path (21 or 19) and/or to the main conveying path (18).

7 Claims, 4 Drawing Sheets

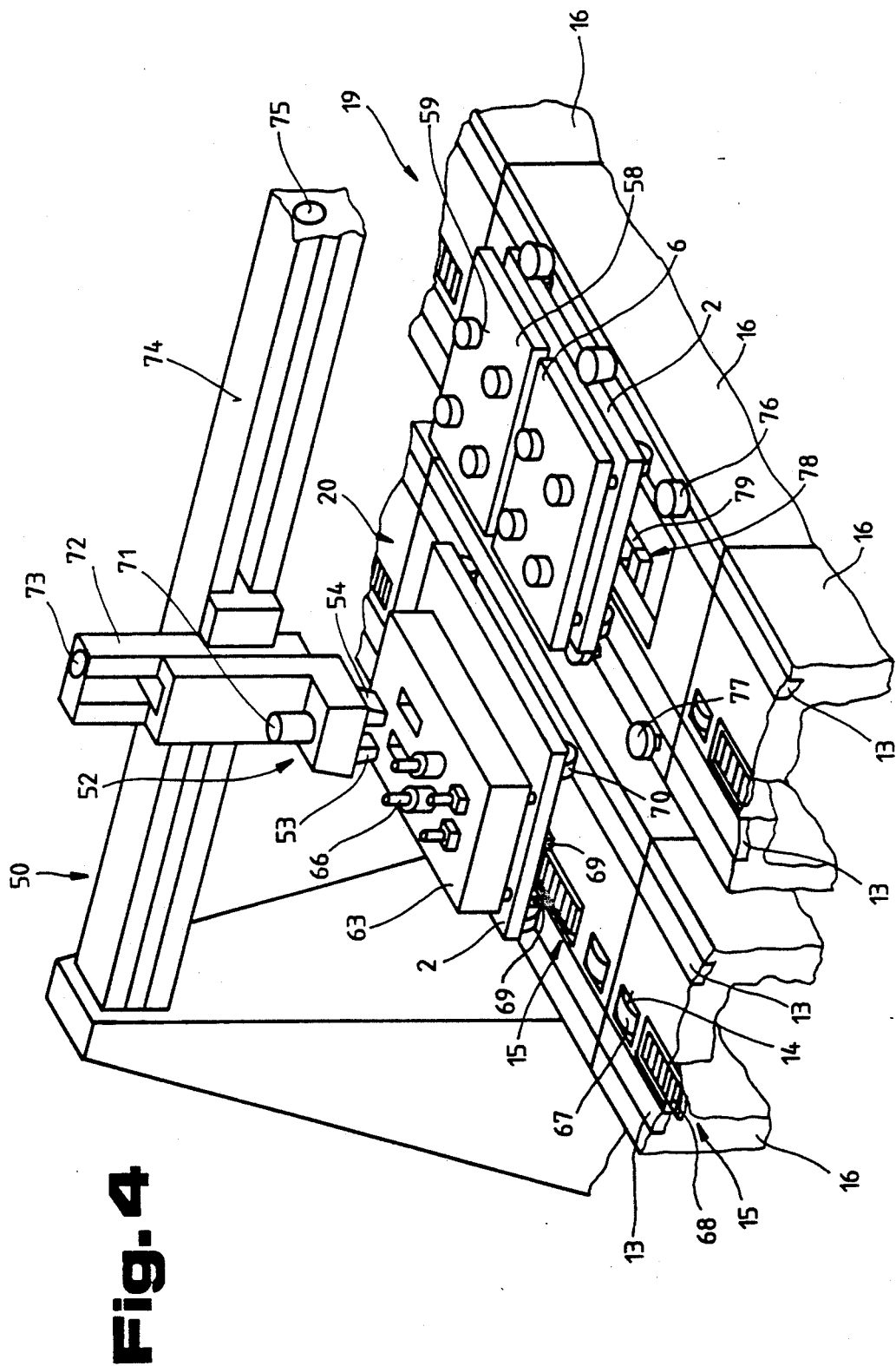

PRODUCTION INSTALLATION

The invention relates to a production installation for assembling and/or processing components made up of several individual parts wherein the individual parts and/or components are disposed and/or assembled and/or processed on pallet trays which are disposed, preferably interchangeably, on carriages which are guided along the conveyor track of a conveyor device in which the conveyor track has parallel conveying paths extending in sections parallel to a main conveying path and connected by transverse conveying paths to the main conveying path.

In installations of this type, a basic distinction can be made between so-called loosely concatenated and rigidly concatenated installations. In loosely concatenated installations, the workpiece carriers or carriages are moved along the installation completely independently of one another and, in the event that a device in a single workstation breaks down, for a specific period of time this has virtually no effect on the activity of the other workstations. In rigidly concatenated installations, the workpiece carriers are interconnected in their movement so that, if faults arise in the vicinity of one workstation, all the workpiece carriers and all the workstations are blocked. Each of the two types of installation has its own range of application, the rigidly concatenated installations being used where only a few workstations are concatenated since the total utilization rate is a product of the utilization rates of the individual workstations. Loosely concatenated installations are generally used to concatenate a multiplicity of workstations, e.g. up to 40 or more, since in this case the utilization rate is then a value compounded from the individual occurrences of faults rather than the product of the utilization rates in the individual stations.

Many different installations with loose concatenation are already known—for example, from my U.S. Pat. Nos. 681,043, 4,762,218, 4,619,205, 4,530,287 and 4,492,297—which have proved successful in practice for concatenating a plurality of workstations. The workpiece carriers or carriages are in each case guided along lateral and vertical guideways independently of one another, and appropriate use of conveying rollers pressed against the side surfaces of the workpiece carriers ensures lateral and vertical guidance of the workpiece carriers without any play. Thus, accurate positioning of the workpiece carriers is achieved throughout the entire course of such an installation in cooperation with the drive means.

It is also known from my U.S. Pat. No. 4,884,330 and U.S. patent application Ser. No. 609,071, now U.S. Pat. No. 5,103,963, to arrange the individual parts at as early a time as possible in a predetermined order which is to be maintained up to the point of their assembly in a workstation or processing station. For this purpose, the individual parts are individually deposited into unit receivers and are moved in a workstation or processing station into a reference position relative to an assembly workpiece carrier which is similarly an independently movable carriage whereupon the individual parts are removed from the unit receiver and are assembled or processed on the assembly workpiece carrier or an assembly location provided there. A work area which is separated from the workstations or processing stations, possibly with storage devices interposed, is provided for fitting the individual parts into the unit receivers.

This process and apparatus have proved eminently successful in practice for fully automated processing and assembly processes although it has proved difficult to achieve a combination of manual and fully automated assembly processes within the same installation using this process and this apparatus.

The aim of the present invention is to provide a production installation of the type mentioned initially which permits flexible adaptation even to components which are to be assembled in smaller piece numbers, both in terms of the individual parts required and in terms of the tools required, and which should moreover be as inexpensive as possible to manufacture while having a high reutilization rate.

The aim of the invention is achieved in that there is associated with, parallel to and directly adjacent to the parallel conveying path, a subsidiary conveying path which is connected preferably by junction stations to the transverse conveying or parallel conveying path and/or the main conveying path. This arrangement of the parallel conveying path and a subsidiary conveying path directly alongside it creates the possibility of providing several workpiece carriers or pallet trays in the handling or working range of an operator for manipulating parts or carrying out assembly processes but at the same time also makes it possible to position the grab holders, in which individual parts are held in readiness for assembly or manipulation, for the operator in the manipulation range in question and at the same time to change them quickly. In an astonishingly simple manner, this creates the possibility of feeding the correct individual parts required for individual assembly processes to the operator and, if necessary, of precisely determining the number of parts, thereby preventing faulty assembly especially in the case of components having a small number of parts and different individual parts and also allowing a wide variety of types of component to be perfectly processed or assembled.

According to a specific embodiment, the subsidiary conveying path is disposed on the side of a parallel conveying path remote from an operator and a storage conveying path is associated with this subsidiary conveying path, preferably between it and the main conveying path, with the result that the carriage for the pallet tray, on which the manipulation or assembly processes are carried out, is located closer to both operators than the subsidiary conveying path on which the parts for processing are placed in readiness or the grab holders are positioned.

It is also advantageous if the transverse and/or subsidiary and/or parallel conveying paths are connected to stand-by conveying paths since carriages with superstructural parts or pallet trays or grab holders, which are required, for example, only for a short duration or for quite specific manipulation processes or for retooling of the workplace or of the handling or processing equipment disposed in the workplace, can easily be held in readiness or used in the stand-by conveying paths.

It is also possible for the stand-by conveying path to be connected by the main conveying path to the parallel conveying path so that central stand-by conveying paths can be disposed with the result that the carriages, which are parked therein and on which the containers or pallet trays, tools or the like are disposed, can easily be fed to different parallel conveying paths.

It is also advantageous, however, if a central stand-by conveying path is provided for several conveying paths since the carriages frequently required for each assembly machine and having different tools, measuring instruments and the like can then be centrally parked.

According to a further embodiment, a return conveying path is disposed between the parallel conveying path and the main conveying path, thereby allowing the alternately required carriages with the containers or pallet trays disposed thereon to be interchanged very rapidly and stored in the intervening period in the direct vicinity of their area of use.

It is also possible for the storage conveying path and/or the return conveying path simultaneously to form the stand-by conveying path, with the result that the storage or return conveying path can be used at the same time as a stand-by conveying path.

However, it is also advantageous if the parallel conveying path and the subsidiary conveying path are directly adjacent to one another, with the safety device interposed, and the storage conveying path or the return conveying path is disposed at a distance from these since this means that the carriages with their superstructural parts can move in the storage conveying path or return conveying path without endangering the operator even if the safety devices have been released or removed and the manual work sequence is being carried out in the parallel conveying path and the subsidiary conveying path directly adjacent to it.

Furthermore, it is also possible for a feed device for the carriages, which can be independently acted upon by the other feed devices, to be associated with the operator in the parallel conveying path, thereby additionally preventing any risk of injury to the operator while the carriages within his operating range are being manipulated.

According to a further embodiment, a parallel conveying path and at least one subsidiary conveying path are disposed immediately adjacent and parallel to one another, and a handling device is arranged so as to span these conveying paths at right angles to the conveying direction, thereby allowing the manipulation times to be kept very short for shifting individual parts or carrying out operating processes which involve the carriages disposed next to one another on the two conveying paths and the superstructural parts disposed thereon.

However, it is also further possible for carriages having pallet trays to be disposed on the parallel conveying path and for a carriage having a pallet tray with assembly receivers, or a retooling pallet and possibly a drive pallet to be disposed on the subsidiary conveying path, thereby allowing the parts to be processed on the assembly receivers to be easily supplied from the carriages on the subsidiary conveying path.

According to another advantageous construction, two subsidiary conveying paths are associated with the parallel conveying path, parallel and immediately adjacent to it, and carriages having pallet trays with component and/or unit receivers and possibly an assembly receiver are disposed movably along the conveying direction on the parallel conveying path and carriages having pallet trays for a plurality of, in particular identical, individual parts are provided movably along the guideways on a subsidiary conveying path and a pallet tray is movably disposed on the further subsidiary conveying path and has at least grab tools or grab fingers and possibly assembly receivers and/or receivers for incorrectly processed components, thereby allowing the working times for an assembly cycle to be kept very short and at the same time keeping down the necessary cost of manufacturing such production installations.

For a clearer understanding of the invention, it is described in greater detail hereinafter with reference to the embodiments illustrated in the drawings wherein FIG. 1 shows a plan view in a simplified diagrammatical form of a production installation made up of several rectangular track sections and having, in accordance with the invention, feed devices of varying construction;

FIG. 4 shows an extremely simplified, diagrammatical view of part of a production installation in the region of an assembly cell with the drives and positioning devices associated with the individual carriages and the handling device.

Figure 1:
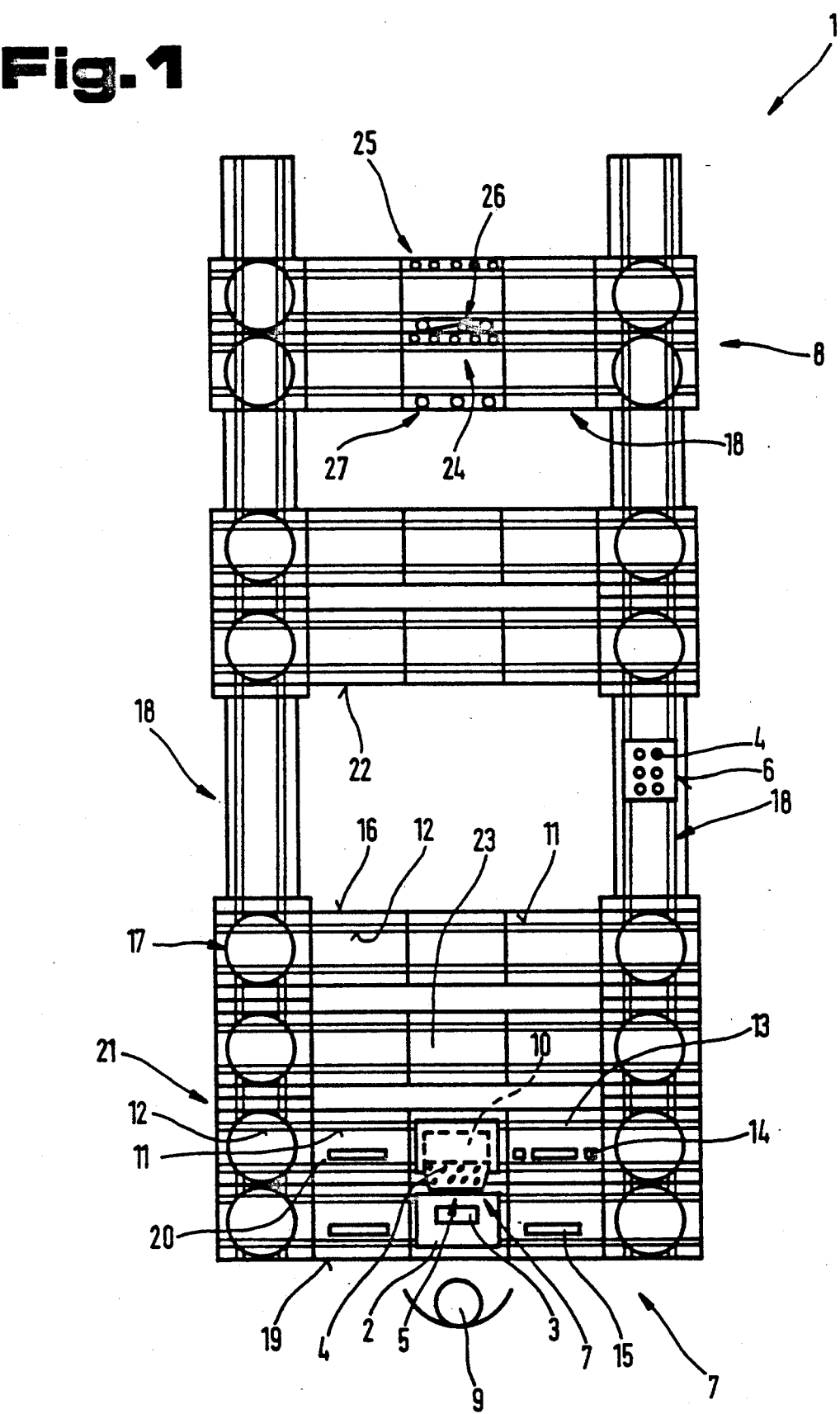

FIG. 1 shows a production installation 1 which is used for processing or assembling components 3 disposed on carriages 2. These components 3 are made up of a large number of individual parts 4 which are placed in readiness for assembly in containers 5 or on pallet trays 6. Such a production installation may comprise, for example, a workstation 7 and a workstation 8. Manipulation, assembly and processing operations are carried out by an operator 9 in the workstation 7, while the workstation 8 takes the form of a so-called CNC module, i.e. a fully automated assembly and processing station. Assembly carriages 2 and carriages 10 for the containers 5 or the pallet trays 6 are preferably of an identical type and can be moved from one workstation 7 to the other workstation 8 independently of one another by means of feed devices 15 along vertical and lateral guideways 13 and 14 formed by individual track sections 11, 12, i.e. by means of so-called loose concatenation.

The individual track sections 11, 12 are disposed on transport stations 16 or junction stations 17. The transport stations 16 and junction stations 17, which may also be referred to as transport and junction modules since they are advantageously of identical dimensions and can be joined together in any desired layout, may be arranged in any order to form the main conveying paths 18 and parallel conveying paths 19 or subsidiary conveying paths 20 which are required to put together such a production installation 1. Transverse conveying paths 21 may be provided for connecting these main conveying paths 18, parallel conveying paths 19 and subsidiary conveying paths 20. In addition, return conveying paths 22 and storage conveying paths 23 may also be provided to enable the same carriages 2 to run several times through a main conveying path 18 or a parallel conveying path 19 past an operator 9. Feed devices 15 and 26 or 27 of varying construction may then be disposed for these transport and junction stations 16 and 17 and transport stations 24, 25 in the region of the workstation 8.

Figure 2:
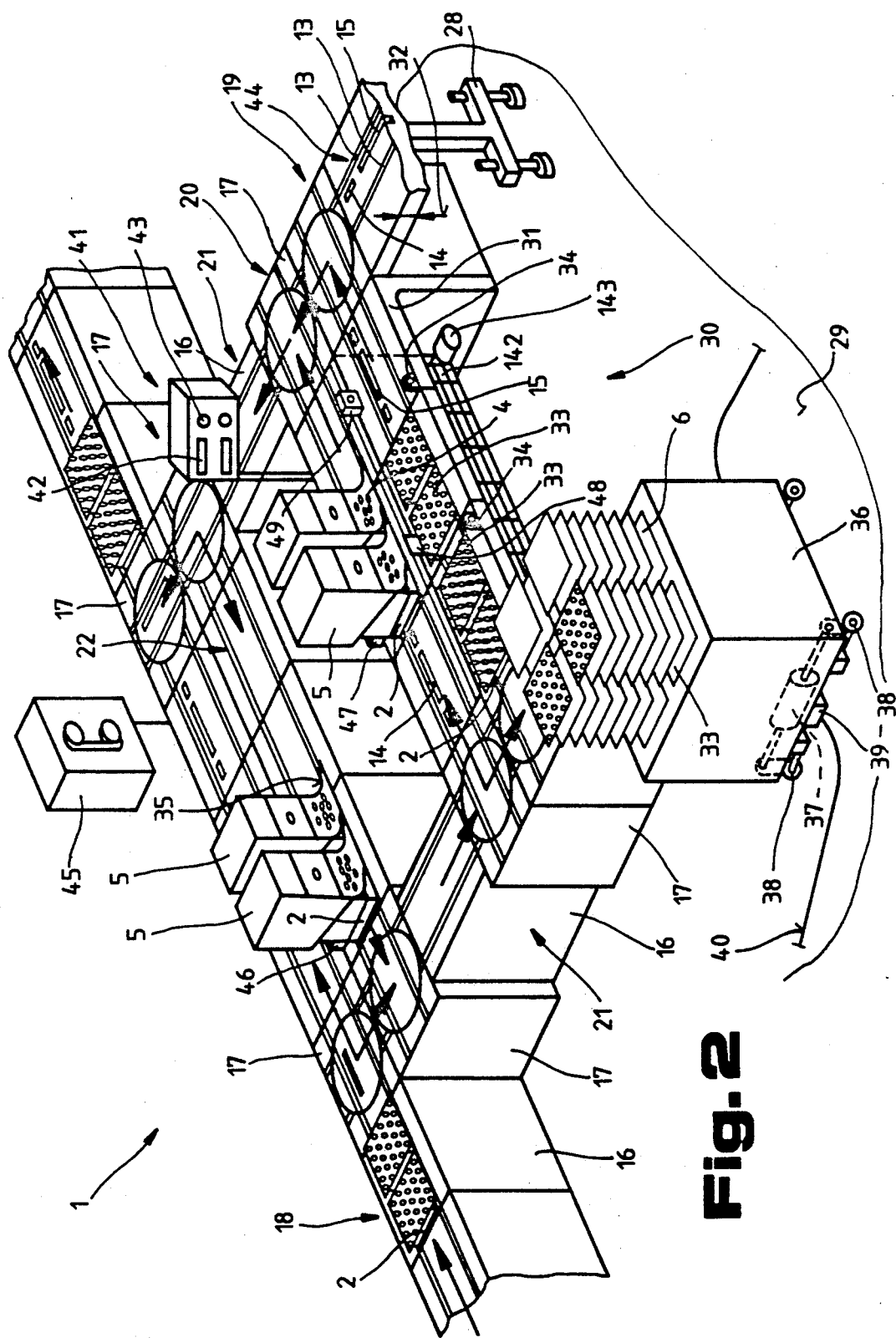
FIG. 2 shows an extremely simplified, diagrammatical view of part of a production installation in the region of a manual work site with the carriages disposed in this region and the pallet trays and grab holders disposed thereon.

FIG. 2 shows part of a production installation 1 having a main conveying path 18, a parallel conveying path 19, a subsidiary conveying path 20 and a return conveying path 22. The parallel conveying path 19, the subsidiary conveying path 20 and the return conveying path 22 are each connected to the main conveying path 18 by means of junction stations 17, which also form integral parts of transverse conveying paths 21 and between which, as illustrated, a transport station 16 may also be disposed. The main conveying path 18 is connected to the parallel conveying paths 19 similarly by means of junction stations 17. As is diagrammatically illustrated at one point only for the sake of clarity, the individual transport stations 16 and junction stations 17 may be supported by means of support elements 28 on a contact surface 29, for example the floor of a production bay.

The parallel conveying path 19 forms a manual work site 30 where, as FIG. 1 shows, an operator 9 carries out handling or assembly jobs. For this purpose, transport stations 31 may have a lower height 32 than the transport stations 16 in order to afford the operator 9 more leg room. Containers 5, e.g. grab holders, are disposed in the subsidiary conveying path 20 on carriages 2 which are movable along the vertical and lateral guideways 13, 14. Located in these grab holders are individual parts 4 which will be placed and assembled on pallet trays 6 and 33. Each of these pallet trays 6 or 33 is disposed on its own carriage 2. However, it is just as possible for several of these pallet trays 6 or 33 to be disposed on a common carriage 2. The carriages 2 of both the containers 5 and the pallet trays 6 and 33 are of identical construction and are moved forward by means of feed devices 15 along the lateral and vertical guideways 14 and 13 and are stopped and positioned in the required positions along these guideways.

Independent buttons 34 for two-hand operation may be provided, for example, to actuate the feed devices 15 in the region of the parallel conveying path 19 so as to avoid injury to the operator when the individual carriages 2 with the pallet trays 6, 33 disposed thereon are moving. As is later described in more detail, the grab holders are provided with grab cups 35 to permit ergonomic removal and grasping of the individual parts 4. As is also shown, it is also possible for the pallet trays 6 and 33, either empty or filled with individual parts 4, to be moved by a transport carriage 36 into the region of the parallel conveying path 19 so that the operator can deposit these pallet trays 6 and 33 onto the transport carriage 36 or remove the trays from it. The transport carriage 36 may also be self-propelled by providing it with its own drive motor 37 and steerable wheels 38 as well as with a scanning head 39 for controlling the steerable wheels 38 and the drive motor 37 in response to signals from a conductor 40 which is, for example, set into the track. Among other things, it is also possible to keep empty pallet trays 6 in reserve on the transport carriage 36 in order to fill them with individual parts 4 in the region of the parallel conveying path 19, while the pallet trays 33 with finished components 3 can be deposited on the transport carriage 36 for further processing or packing.

While the pallet trays 6 required for the individual components 3 for assembly can then be easily adapted to different components 3 by using, for example, the transport carriage 36, it is similarly possible by arranging the subsidiary conveying path 20 to interchange the containers 5 or the grab holders with the grab cups 35 in the event of a change of type by moving them by means of their carriages 2. For this purpose, further containers 5 on carriages 2 can be kept in reserve in a return conveying path 22, which can, for example, also be used as a storage conveying path, and can be swapped in the event of a change of type with the containers 5 located in the subsidiary conveying path 20. Instead of the two containers 5 shown in the subsidiary conveying path 20, it is of course also possible, in the event of a change of type, for several containers 5 or only a single container 5 to be parked there. It is further possible, in the event of a change of type, to bring over the containers 5 with the relevant required individual parts 4 from a central feeder station or to move up the containers 5 with the new individual parts 4 for processing on their own transport carriage 36, while the containers 5 no longer required can be transported away by the transport carriage 36. To provide the operator with comprehensive information about the work processes to be carried out and possibly about his work output and to enable the operator to communicate with his superior without having to leave his post, a display and operator unit 41 which may comprise a display field 42 and an operator field 43 is disposed in the region of the parallel and subsidiary conveying paths 19, 20. Several liquid-crystal displays may be disposed at the display field 42, or alternatively a screen on which the work processes to be carried out by the operator and possibly, using a help key, additional operator's instructions can be called or the residual piece numbers or the piece numbers yet to be produced can be displayed in plain text. At the operator field 43, the work processes required for a change of type can be initiated or additional information can be requested from a superior or the higher-level central computer. If it is also necessary for the operator to be equipped with suitable auxiliary tools for the manipulation and assembly processes or if the work site has to be reorganized owing to changes in the components to be assembled, it is also possible to provide a stand-by conveying path 44 which can be used to introduce further carriages 2, which may be fitted, for example, with the necessary retooling parts or tools, into the parallel conveying path 19, it being possible also to use this stand-by conveying path 44 to interchange individual carriages 2 and to swap carriages 2 with permanent superstructural parts for others with similarly permanent but different superstructural parts.

In order to manage the individual carriages 2 in conjunction with the display and operator unit 41 and a higher-level control device 45, which may be connected by lines to the individual display and operator units 41, the carriages and/or the containers 5 and the pallet trays 6 and 33 may be provided with coding elements 46, 47 and 48 which may be scanned in the region extending along the individual track sections 11 and 12 of the individual transport stations 16 and junction stations 17 by means of coding devices 49, of which only one is diagrammatically illustrated. Known devices employing magnetic cards, bar codes or any other type of data carrier may be used for this coding device 49 and the coding elements 46 to 48.

The design of the vertical and lateral guideways 13, 14 and of the feed device 15 as well as the design of the carriages 2 is similarly entirely discretionary. However, preferential use is made of feed devices 15 of the type described, for example in my U.S. Pat. Nos. 4,492,297, 4,619,205 and 4,762,218. It is equally possible, however, to use the feed devices 15 described below both in the junction stations 17 and in the transport stations 16.

It is furthermore also possible, as will be described in greater detail hereinafter, for the containers 5 or the grab holders forming these to be interchangeably placed on the carriages 2. This allows these containers 5 located in the subsidiary conveying paths 20 to be moved in their own pass into the region of the parallel conveying path 19 so that they can be exchanged by the operator for containers holding different individual parts 4.

Figure 3:
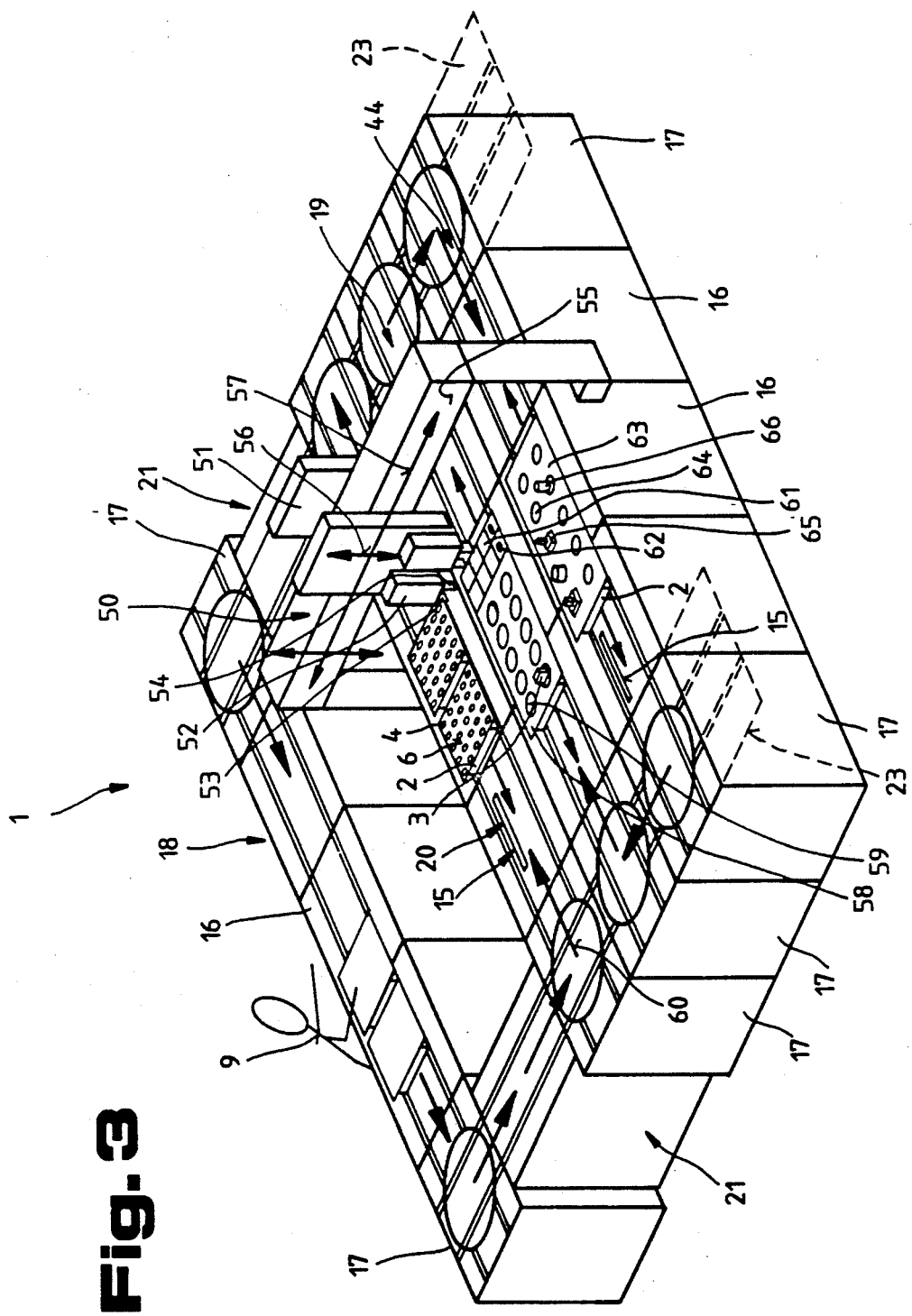
FIG. 3 shows an extremely simplified, diagrammatical view of part of a production installation in the region of an assembly cell.

FIG. 3 shows an arrangement of various track sections comprising transport stations 16 and junction stations 17 which may, for example, form a so-called CNC module, i.e. a computerized numerical control module, or a CAA, computer aided assembly module. While individual transport stations 16 with two junction stations 17 form a main conveying path 18, a parallel conveying path 19 and a subsidiary conveying path 20 as well as a stand-by conveying path 44 are arranged so that they are connected to the main conveying path 18 by transverse conveying paths 21. Each of these conveying paths 19, 20 and 44 is connected by junction stations 17 of the transverse conveying paths 21 to the main conveying path 18. The parallel conveying path 19, the subsidiary conveying path 20 and the stand-by conveying path 44 are spanned by a handling device 50 which may, for example, have a slide 51. In the present embodiment, two grab devices 52 with grab fingers 53, 54 are disposed on the slide 51. It is equally possible, however, for only one grab device 52 to be disposed on this slide 51.

It is also possible for the slide 51 to be adjustable vertically in the directions of the double arrow 56 relative to a horizontal guideway 55. It is equally possible, however, for the entire horizontal guideway 55 to be adjustable in the directions of the double arrow 56 relative to the parallel conveying path 19 or the subsidiary conveying path 20 and the stand-by conveying path 44. While the carriages 2 are being positioned in the parallel conveying path 19 and in the subsidiary conveying path 20 as well as in the stand-by conveying path 44 by means of the feed devices 15, individual parts 4 or components 3 are being transferred in the direction of the double arrow 56 or a double arrow 57 by means of the handling device 50. Thus, while an individual part 4, for example, has been removed from a pallet tray 6 by the handling device 50 and is moved into the region of a pallet tray 58 with assembly receivers 59, the next individual part for removal can be moved into position in the direction of transport - arrow 60 - by moving the carriage 2.

Naturally, the carriages 2 may also be made to move counter to the direction of travel indicated by the arrow 60 to permit flexible positioning relative to the handling device 50. The pallet tray 58 may also be provided with receivers 61 for incorrectly assembled components 62. Finally, a pallet tray 63 having receivers 64 for change tools 65 may be disposed on the carriage 2 located in the stand-by conveying path 44. Furthermore, as extensions to the transverse conveying paths 21, storage conveying paths 23 my be provided on which the pallet trays 63 having the change tools 65 for components 3 to be differently assembled are kept in reserve so that a change in the type for assembly can be rapidly effected in the region of the production installation 1 formed by a so-called assembly cell. Movement of the change tools 65 and interchanging of the grab fingers 53, 54, for which swapping tools 66 can similarly be held in reserve in the receivers 64, are effected by means of the handling device 50. Forward movement and positioning of the individual change tools and swapping tools 65, 66 are similarly effected by means of the feed devices 15 as these are disposed in the region of all the transport stations 16.

The exchange of empty pallet trays 6 for pallet trays 6 filled with individual parts 4 may be effected, for example, in the region of the main conveying path 18 by an operator 9. However, it is equally possible for the empty pallet trays 6 to be filled with individual parts 4 by the operator 9. The pallet trays 6 may of course alternatively by exchanged automatically or be filled with individual parts by a handling device 50 in conjunction with an automatic supply and distribution device for the individual parts 4.

FIG. 4 shows part of the parallel conveying path 19 and the subsidiary conveying path 20 in the region of the handling device 50. The individual transport stations 16 comprise housings on whose upper side the vertical guideways 13 formed by guide rails, for example hardened steel rails, are disposed. Disposed between the vertical guideways 13 are lateral guide rollers 67 forming lateral guideways and the toothed belts 68 of the feed device 15. The side edges of the toothed belts 68 and lateral guide rollers 67 cooperate with lateral guide rails 69 which are disposed on the underside of the carriages 2. Guide rollers 70 which are movable on the vertical guideways 13 are used for vertical guidance of the carriages 2. As already described earlier, pallet trays 63 and 6 are disposed on the carriages 2. The pallet tray 63 is provided with swapping tools 66 for the grab fingers 53 and 54 of the handling device 50. An actuating drive 71 is provided for actuating the grab fingers 53, 54. The grab fingers are also movable along a vertical guideway 72 by means of an integrated adjusting drive 73. They are similarly movable along a horizontal guideway 74 by means of an adjusting drive 75 incorporated therein. In order to achieve precise positioning for the individual work processes, the carriages 2 with the pallet trays 6 and 58, on which assembly receivers 59 are disposed, are driven, not by the feed device 15 which has a toothed belt 68 and in which forward movement and positioning of the carriages 2 are effected for example by a stepping motor, but by friction rollers 76 which are elastic in a radial direction and are supported on side edges of the carriages 2. These press the carriages 2 against guide rollers 77 formed, for example, by ball bearings which are disposed adjacently on the opposite side of the vertical guideway 13 and thereby form a precise reference position for the carriages 2 with the pallet trays 6 and 58 disposed thereon. For positioning of the carriages 2 longitudinally of the lateral guideways 14 or the lateral guideways 14 formed by the guide rollers 77 and the friction rollers 76, a positioning device 78 is used which cooperates with stops 79 disposed on the underside of the carriages 2 and permits positioning of a high repeat accuracy and precision over extended periods of use. As a result, precision joining and assembly processes may be carried out. Naturally, in the case of particularly awkward parts or parts which equally require precise positioning before being grasped, it is possible also to provide a feed device formed by friction rollers 76 and guide rollers 77 in the region of the subsidiary conveying path in which the individual parts 4 are positioned for removal. The same naturally applies to the stand-by conveying path 44 if the change tools 65 or swapping tools 66 to be interchanged need to be precisely positioned in this way before being interchanged.

I claim:

1. A production installation for assembling or processing structural components comprised of individual parts, which comprises (a) carriages supporting pallet trays carrying the structural components or the individual parts, (b) a conveyor track comprised of individual and separable conveyor track sections, each conveyor track section comprising (1) vertical and lateral guideways for the carriages, (c) a feed device at each conveyor track section operable for conveying the carriages independently of each other along the vertical and lateral guideways of the conveyor track, and (d) the conveyor track defining (1) a main conveying path for transporting the carriages in a conveying direction, (2) a conveying path extending parallel to the main conveying path, (3) two connecting conveying paths spaced from each other in the conveying direction and extending transversely to the conveying direction between the main conveying path and the parallel conveying path, (4) an auxiliary conveying path extending between, and parallel to, the main conveying path and the parallel conveying path, and (5) respective ones of the conveyor track sections constituting transport stations for the carriages and junction stations respectively interconnecting the transversely extending conveying paths with the main conveying path, the auxiliary conveying path and the parallel conveying path, the vertical and lateral guideways on the junction stations guiding the carriages for one of the conveying paths to the interconnected conveying path.

2. The production installation of claim 1, wherein the conveyor track further defines a return conveying path extending between, and parallel to, the auxiliary conveying path and the main conveying path, respective ones of the junction stations interconnecting the transversely extending conveying paths with the return conveyor path, and further comprising a handling device for manipulating the individual parts, the handling device spanning the parallel and auxiliary conveying paths.

3. The production installation of claim 1, wherein the conveyor track further defines a return conveying path extending between, and parallel to, the auxiliary conveying path and the main conveying path, respective ones of the junction stations interconnecting the transversely extending conveying paths with the return conveyor path, and further comprising a manual work station for an operator adjacent a respective one of the conveyor track sections in the parallel conveying path, the feed device at said one conveyor track section being operable by the operator.

4. The production installation of claim 1, wherein the conveyor track further defines storage conveying paths aligned with the transversely extending conveying paths and interconnected to the parallel conveying path by the junction stations interconnecting the transversely extending conveying paths and the parallel conveying path, and an additional auxiliary conveying path and parallel conveying path interconnected by additional junction stations to the storage conveying paths.

5. The production installation of claim 1, wherein the conveyor track further defines a stand-by conveying path extending adjacent, and parallel to, the parallel conveying path, and storage conveying paths aligned with the transversely extending conveying paths and interconnected to the stand-by conveying path by junction stations interconnecting the transversely extending conveying paths and the stand-by conveying path, and further comprising a handling device for manipulating the individual parts, the handling device spanning the auxiliary, parallel and stand-by conveying paths.

6. The production installation of claim 5, wherein the conveyor track further defines two return conveying paths extending between, and parallel to, the auxiliary conveying path and the main conveying path, respective ones of the junction stations interconnecting the transversely extending conveying paths with the return conveying paths.

7. The production installation of claim 1, wherein the conveyor track further defines additional transversely extending conveying paths interconnected to the parallel conveying paths by the junction stations interconnecting the transversely extending conveying paths and the parallel conveying path, and a stand-by conveying path, a storage conveying path, an additional auxiliary conveying path and an additional parallel conveying path extending parallel to the main conveying path, respective ones of the junction stations interconnecting the additional transversely extending conveying paths with the stand-by, storage, additional auxiliary and additional parallel conveying paths.

* * * * *